Figure 1:
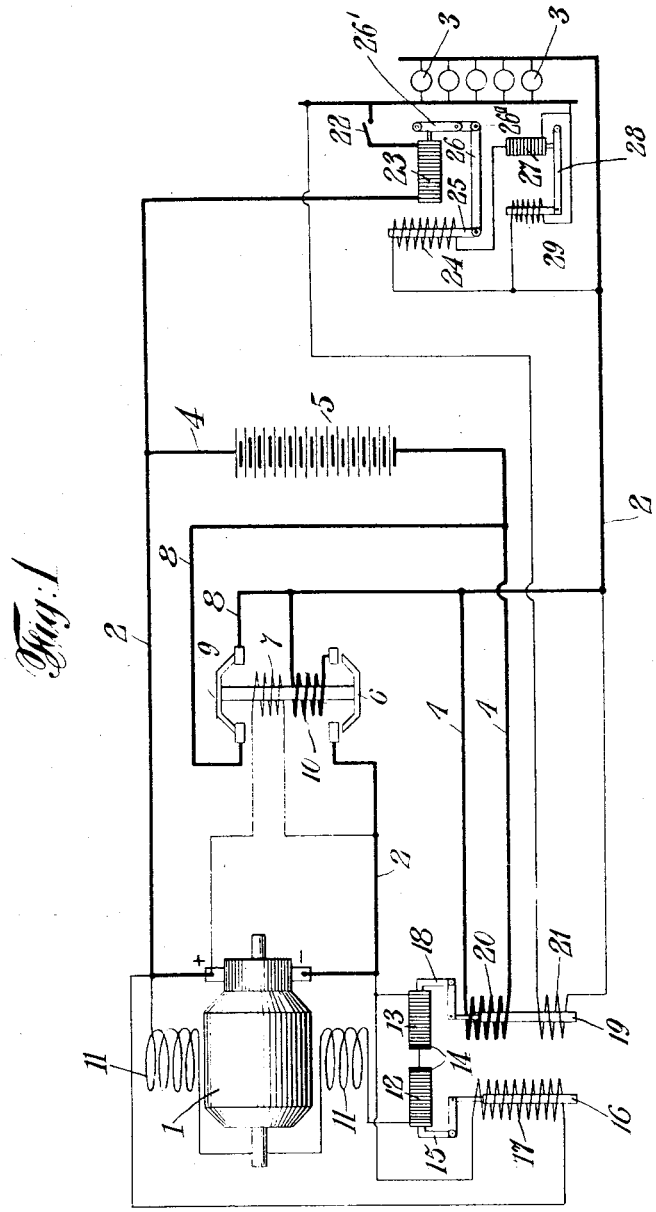

J. W. JEPSON.
ELECTRICAL SYSTEM OF DISTRIBUTION.
APPLICATION FILED FEB. 15, 1916.

1,179,373.

Patented Apr. 11, 1916.
3 SHEETS—SHEET 1.

Inventor
John W. Jepson
by his Attorneys
Kenyon & Kenyon

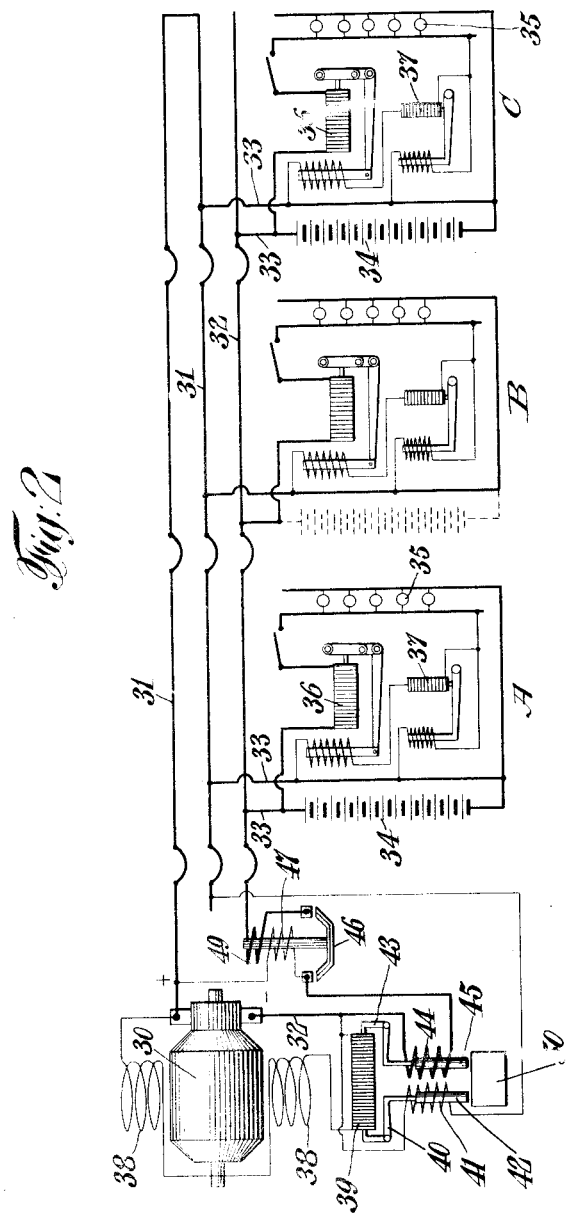

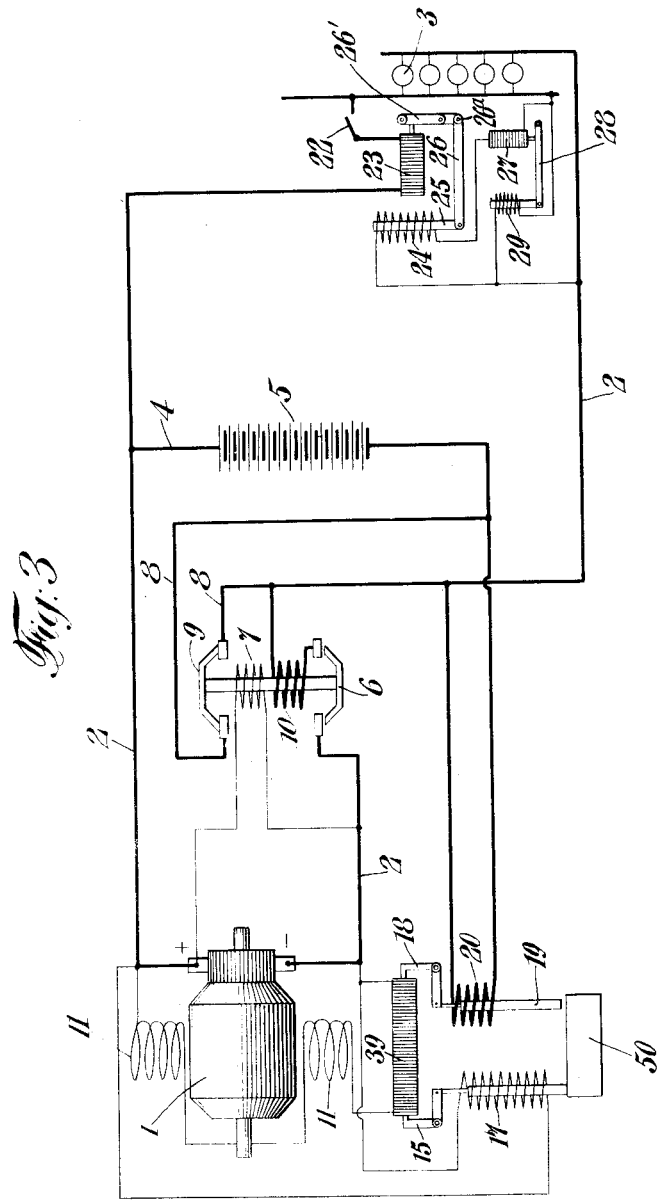

UNITED STATES PATENT OFFICE.

JOHN W. JEPSON, OF BUFFALO, NEW YORK, ASSIGNOR TO GOULD COUPLER COMPANY, A CORPORATION OF NEW YORK.

ELECTRICAL SYSTEM OF DISTRIBUTION.

1,179,373.  Specification of Letters Patent.  Patented Apr. 11, 1916.

Application filed February 15, 1916. Serial No. 78,349.

*To all whom it may concern:*

Be it known that I, JOHN W. JEPSON, a citizen of the United States, and a resident of Buffalo, county of Erie, State of New York, have invented certain new and useful Improvements in Electrical Systems of Distribution, of which the following is a specification.

This application is a continuation in part of my prior application Serial No. 539,917, filed Jan. 25, 1910 and a continuation in part of my prior application Serial No. 587,003, filed Oct. 14, 1910 in which prior applications I now claim only specific features or forms of the invention, the broad claims to the invention being made in this application.

The invention relates to improvements in electrical systems of distribution and more especially to systems in which a storage battery and work circuit are supplied by a main generator and automatic means are provided for regulating the action of the generator in accordance with the needs of the system.

One object of my invention is to provide in such a system an arrangement whereby the generator may be regulated in accordance with the needs of the battery, so that the charging current may be limited and yet when the battery becomes charged to a certain extent this charging current may be cut down as desired. It is one purpose of my invention to carry out these features with a minimum amount of apparatus which is extremely simple and efficient in its operation and construction.

Further objects, features and advantages will more clearly appear from the detailed description given below taken in connection with the accompanying drawings which form a part of this specification.

In the drawings, Figure 1 is a diagram of a system embodying one form of my invention as applied to a car lighting system in which the main generator is driven by the movement of the car. Fig. 2 is a modified embodiment of various of my improvements as applied to a train lighting system in which the main generator is driven from any suitable source of power. Fig. 3 is a similar diagram showing a further modified embodiment illustrating certain features of Figs. 1 and 2 combined in one system.

Referring to Fig. 1, 1 represents a main generator supplying the mains 2, 2, which supply the work circuit or lamps 3. Connected across the mains 2, 2 in a circuit 4 is a storage battery 5. In the negative main 2 is a switch 6 arranged to close the main circuit when the voltage of the generator has reached its proper value. For this purpose the switch 6 is arranged to be raised by an electromagnet coil 7 connected across the terminals of the generator 1. When the generator reaches this predetermined voltage the switch 6 closes the circuit through the negative main 2 and at the same time opens the circuit through conductors 8 by opening switch 9. A coil 10 in the negative main 2 is also arranged to act to increase the effect of the coil 7 when the generator is furnishing current but acts to open the switch 6 upon the voltage of the generator, decreasing below that of the battery, in a well known manner.

The generator 1 is provided with shunt fields 11 connected across its terminals. In series with the fields 11 is a carbon pile rheostatic apparatus consisting of two sets of carbon blocks or variable resistances 12 and 13. Each of these variable resistances is provided with a fixed member 14 at its inner end although these fixed members are not essential to the broad aspects of my invention. The members 14 may be made movable, forming one long pile and still certain advantages of the present invention attained. The resistance of the carbon pile 12 is varied by means of a bell crank lever 15 connected to the core 16 of the electromagnet or solenoid 17. The windings of the electromagnet or solenoid 17 are connected in shunt across the terminals of the generator so as to be responsive to variations in voltage changes of the generator and battery. The carbon pile resistance 13 is varied by a bell crank lever 18 pivotally connected to a core 19. The movement of the core 19 is controlled by electromagnet windings 20 and 21, thus forming a suitable solenoid for the regulation of the resistance 13. The windings 20 are connected between the generator and the battery in series with the battery in the circuit 4, while the windings 21 are connected in shunt across the work circuit or lamps 3, 3. A switch 22 is provided in the positive main 2 for connecting the battery and generator to the work circuit.

Adjacent the switch 22 and between the battery 5 and the work circuit I provide a carbon pile resistance 23 in series in the positive main 2. The carbon pile resistance 23 is controlled by a coil 24 operating upon the core 25 which actuates a bell crank lever 26 pivoted at 26ª. The short arm of the lever 26 is pivoted to the lever 26' so that when the core 25 is moved upwardly the lever 26 moves the lever 26' to decrease the pressure on the carbon pile 23. The windings 24 are connected across the work circuit or lamps 3, 3 and in series therewith there is provided a second carbon pile 27 operated by a lever 28 controlled by a coil 29 also connected across the work circuit or lamps 3, 3. The coil 24 controls the carbon pile 23 so as to keep the voltage at the translating devices substantially constant, and this action is magnified by the variations in the carbon pile resistance 27 which is controlled by coil 29.

In operation the battery is arranged to feed the work circuit 3, 3 when the generator is not running or when its voltage is too low for practicable operation thereof. Under these conditions the switch 9 closes the circuit 8, 8, thereby connecting the battery directly to the lamps 3, 3, although the carbon pile resistance 23 is included in circuit in order that the voltage at the lamps may be maintained substantially constant irrespective of changes in the battery voltage. If now the speed of the main generator be increased so that it will produce a voltage sufficient to feed the lamps the coil 7 closes the switch 6 and opens the switch 9. This connects the generator with the battery and work circuit and also throws the coil 20 in series with the battery. When the voltage of the generator rises sufficiently to produce the proper charging current for the battery this charging current may be limited or maintained substantially constant by means of the coil 20. That is, when such a charging current is produced the strength of coil 20 is such that it acts upon the core 19 and, without raising the core, nevertheless puts it in a condition of equilibrium. If the voltage of the generator tends to increase, thereby tending to increase the charging current, the coil 20 will raise the core 19, thereby increasing the resistance of the carbon pile 13 and decreasing the generator field strength so that its voltage will be accordingly decreased sufficiently to maintain the charging current substantially constant. If a decrease in generator voltage occurs a reverse action takes place and the coil 20 allows the core 19 to drop, thereby decreasing the resistance of the carbon pile 13 and increasing the voltage of the dynamo 1, so that the charging current may be brought back substantially to the same value. In describing the operation thus far we have assumed that the switch 22 was open, thus disconnecting the work circuit, so that the coil 21 was deënergized.

The operation thus described continues until the battery becomes properly charged or reaches some predetermined condition of charge. When it has reached a predetermined state of charge, indicated by its rise in voltage to a predetermined point, and the corresponding rise of the generator voltage, the electromagnet 17 becomes sufficiently energized to place its core 16 in equilibrium. When the battery voltage rises any higher the core 16 is raised, thereby increasing the resistance of the carbon pile 12 and decreasing the generator voltage. This cuts down the charging current as will be clearly understood. Thus the solenoid 16, 17 is not brought into action until the battery has become charged to the desired extent and it then acts to prevent further increase in generator voltage and to decrease the battery charging current. It, therefore, usurps the functions of the variable resistance 13 and the core 19 drops back to its initial position as the charging current decreases, due to the decrease in the charging current. That is, when the battery is receiving its substantially constant charging current the voltage coil 17 and core 16 remain substanially inoperative, and when the voltage coil 17 becomes operative upon the rheostat the current coil 20 and core 19 become substantially inoperative. It is also noted that the electro-magnets operating upon the rheostats 12, 13 operate mechanically independent of one another.

It is desirable when the work circuit is being fed by the generator that the charging current to the battery be somewhat decreased although maintained substantially constant after such decrease, in order that the generator may not be overloaded. For this purpose the coil 21 acts to aid the coil 20 by usurping part of its functions when the switch 22 is closed. That is, upon the closing of the switch 22 the coil 21 becomes energized and produces a constant attractive force upon the core 19. This allows the generator voltage to be kept down with a much smaller charging current so that the total current supplied by the generator may not be excessive.

Referring to Fig. 2 I there show a modified system in which a main generator 30 forms a source of electrical energy for the mains 31 and 32, which mains extend throughout a train of cars, indicated by A, B and C. Each car is provided with a local circuit 33 connected to the mains 31 and 32.

The local circuit 33 feeds a battery 34 and lamps or other translating devices 35. Carbon pile resistances 36 and 37 are provided for maintaining the voltage upon the lamps 35 substantially constant and operated in substantially the same manner as the carbon pile resistances 23 and 27 described in connection with Fig. 1.

The main generator 30 is provided with shunt fields 38 and in series with these I provide a carbon pile resistance or rheostatic apparatus 39 for regulating the strength of the fields and thereby controlling the voltage of the main generator. Operating upon one end of the carbon pile 39 is a bell crank lever 40 controlled by a solenoid or electromagnet windings 41 provided with a core 42. The windings 41 are connected across the mains 31 and 32 so as to be responsive to voltage changes of the generator 30 and batteries 34. Operating upon the other end of the carbon pile 39 is a bell crank lever 43 controlled by electromagnet windings 44 operating a core 45. The windings 44 are connected in series in one of the conductors 32 so as to be responsive to current changes of the generator.

A main switch 46 is provided for connecting the generator 30 to the main conductor 32 extending through the various train units and this switch is controlled by a voltage coil 47 in the same manner that the switch 6 is controlled as described with respect to Fig. 1. A reverse coil 49 is also provided which acts in a well known manner as described with respect to the coil 10.

When the generator 30 is idle or is not producing sufficient voltage the batteries 34 feed their respective work circuits 35. Upon the closing of the main switch the generator 30 supplies the various work circuits or lamps 35 and as its voltage is increased it produces a charging current for the various batteries 34. The apparatus is so arranged that this action will continue until the generator current reaches a predetermined value when any further deviation therefrom will be substantially prevented. This is done by means of the solenoid 44 which if the generator current tends to increase, acts to increase the resistance of the carbon pile 39, thereby increasing the resistance in the field circuit 38 and decreasing the generator voltage so that the generator current is not materially increased. In a similar manner if the generator current tends to decrease the strength of coil 44 decreases thereby allowing the core 45 to drop and decrease the resistance of the carbon pile 39, so that the fields 38 are increased in strength and the generator will produce an increase in voltage to maintain its output substantially constant. This action will continue until the batteries have become more or less charged as indicated by a predetermined rise in voltage thereof. When this condition has been reached the strength of coil 41 becomes sufficient to raise the core 42, thereby increasing the resistance of carbon pile 39, so that any further rise in generator voltage is substantially prevented. This causes the battery charging current to fall off and thereby causes a decrease in the main generator current and the coil 41 usurps the functions of the coil 44 to regulate the generator.

A block 50 is shown placed just below the cores 42 and 45 and spaced a short distance therefrom, so that as either core is raised the block forms a stop for the other and thus acts as means fixing one end or the other, as the case may be, of the carbon pile 39. In the specific form of apparatus shown in my application, Ser. No. 587,003, above mentioned, certain guide rollers for the cores serve as stops by limiting the downward movement of the lever members.

The system shown in Fig. 3 is similar to that of Fig. 1 except that the single pile form of regulating apparatus of Fig. 2 is used.

In all the diagrams, I have shown the rheostatic apparatus in the field of the main generator operated upon and controlled separately by two independently working solenoids or electromagnets. This is important since it provides means whereby the generator may be regulated to limit the current output or charging current and yet when the battery has become charged to the desired extent the voltage coils 17 and 41 are brought into operation to regulate the generator independently of any action of the current coil whereby a more desirable charging current curve is obtained. If both the voltage and current coils were operating upon the same core or armature or on separate cores or armatures rigidly connected this advantage could not be had.

The details of one form of regulating apparatus with which the invention may be carried out are shown and described in my copending application Ser. No. 601,589, filed Jan. 9, 1911.

Although I have described my improvements in great detail nevertheless I do not desire to be limited thereto except as specified hereinafter in the claims, since many changes and modifications may be made without departing from the spirit and scope of my invention.

Having fully and clearly described my improvements, what I claim as new and desire to secure by Letters Patent, is:

1. In an electrical system of distribution, a main generator, a storage battery arranged to be charged thereby, a carbon pile for regulating the voltage of the generator, a coil responsive to current changes for controlling said carbon pile while the battery is charging, and a coil responsive to voltage changes of the battery for controlling said pile and arranged to be brought into operation when the battery has become substantially charged, said first mentioned coil having no effect on the pile when the second mentioned coil is operating and said second mentioned coil having no effect on said carbon pile when said first mentioned coil is operating.

2. In an electrical system of distribution, a main generator, a battery arranged to be charged thereby, a carbon pile in the field circuit of the generator for regulating its voltage, two levers acting on said pile mechanically independent of one another, an electro-magnet for operating one of said levers responsive to current variations and an electro-magnet for operating the other lever responsive to voltage variations.

3. In an electrical system of distribution, a main generator, a battery arranged to be charged thereby, a carbon pile in the field circuit of the generator for regulating its voltage, two levers acting on said pile mechanically independent of one another, one lever acting upon one end of the pile and the other lever acting on the other end of the pile, an electro-magnet for operating one of said levers responsive to current variations and an electro-magnet for operating the other lever responsive to battery voltage variations.

4. In an electrical system of distribution, a main generator, a storage battery and work circuit supplied thereby, a carbon pile for regulating the voltage of the generator and two levers acting mechanically independently on said pile, means for operating one lever affected by current variations and means for operating the other lever responsive to voltage variations of the battery.

5. In an electrical system of distribution, a main generator, a storage battery and work circuit supplied thereby, a carbon pile for regulating the voltage of the generator and two levers acting mechanically independently on said pile, means for operating one lever responsive to current variations and means for operating the other lever responsive to voltage variations of the battery and arranged to be brought into operation to regulate the voltage of the generator when the battery has become substantially charged.

6. In an electrical system of distribution, a generator driven at a variable speed, a work circuit arranged to be fed thereby, a carbon pile for regulating the voltage of the generator, a lever operating upon one end of said pile, and a lever operating upon the other end of said pile, said levers operating responsive to variations in voltage of the battery and current variations respectively.

7. In an electrical system of distribution, a main generator and its circuit and load, rheostatic apparatus arranged to regulate the voltage of the generator and two coils acting to independently mechanically control said apparatus to regulate its action, one of said coils controlling responsive to voltage changes and the other controlling responsive to current changes.

8. In an electrical lighting system, a main generator driven at a variable speed, a storage battery connected to be charged thereby, rheostatic apparatus arranged to regulate the field of the generator, and two coils acting to control said apparatus mechanically independently of one another, one of said coils controlling responsive to voltage changes of the battery and the other coil controlling responsive to current changes.

9. In an electrical system of distribution, a main generator, a work circuit and storage apparatus in operative relation thereto, rheostatic apparatus arranged to regulate the field of the generator, and two electro-magnets acting to mechanically control said apparatus independently of one another, one of said electro-magnets controlling responsive to voltage changes of the storage apparatus and the other electro-magnet controlling responsive to current changes, said voltage electro-magnet being arranged to remain inoperative during the operation of said current electro-magnet until the voltage of the generator reaches a predetermined value.

10. In an electrical system of car lighting, a main generator driven at a variable speed, a work circuit and storage apparatus in operative relation thereto, rheostatic apparatus arranged to regulate the field of the generator, and two electro-magnets acting to mechanically control said rheostatic apparatus independently of one another, one of said electro-magnets controlling responsive to voltage changes of the storage apparatus and the other electro-magnet controlling responsive to current changes of the storage apparatus to maintain a substantially constant charging current, said voltage electro-magnet being arranged to remain inoperative during the operation of said current electro-magnet until the voltage of the generator reaches a predetermined value.

11. In an electrical system of distribution, a main generator, a work circuit and storage apparatus in operative relation thereto, carbon pile rheostatic apparatus arranged to regulate the field of the generator, and two electro-magnets acting to mechanically control said rheostatic apparatus independently of one another, one of said electro-magnets controlling responsive to voltage changes of the storage apparatus and the other electro-magnet controlling responsive to current changes of the storage apparatus, said current electro-magnet being arranged to remain inoperative during the operation of said voltage electro-magnet after the voltage of the generator reaches a predetermined value.

12. The combination of a generator driven at a variable speed, a storage battery supplied thereby, rheostatic apparatus for regulating the field of the generator, and two coils acting to independently mechanically control said apparatus to regulate its action, one of said coils being responsive to current changes of the battery and the other of said coils being responsive to voltage changes of the battery and arranged to remain inoperative until the battery has become substantially charged.

13. The combination of a main generator, a work circuit and storage battery supplied thereby, rheostatic apparatus for regulating the voltage of the generator, and two electro-magnets acting mechanically independently to control said apparatus to regulate its action, one of said electro-magnets being arranged to regulate responsive to current changes and the other electro-magnet being arranged to regulate responsive to voltage changes and one magnet being arranged to remain inoperative after the battery has become substantially charged.

14. In an electrical system of distribution, a main generator driven at a variable speed, a work circuit and storage battery supplied thereby, carbon pile rheostatic apparatus for regulating the field of the generator, and two coils acting to independently control said apparatus to regulate its action, one of said coils being arranged to regulate responsive to current changes and the other coil being arranged to regulate responsive to voltage changes of the battery and arranged to remain inoperative substantially during the operation of said first mentioned coil and until the voltage of the generator has reached a predetermined value and the battery has become substantially charged, when said voltage coil is arranged to come into operation to limit the voltage of the generator.

15. In an electrical system of distribution, a main generator, a storage battery arranged to be charged thereby, rheostatic apparatus for regulating the voltage of the generator, a coil regulating responsive to current changes for controlling said apparatus while the battery is charging, and a coil regulating responsive to voltage changes of the battery arranged to be brought into operation for controlling said apparatus when the battery has become substantially charged, said first mentioned coil having no effect on the apparatus after the second mentioned coil is operating, and said second mentioned coil having no effect on said apparatus when said first mentioned coil is operating.

16. In an electrical system of distribution, a main generator driven at a variable speed, a storage battery and work circuit arranged to be supplied thereby, carbon pile rheostatic apparatus for regulating the field of the generator, an electro-magnet regulating responsive to current changes for controlling said apparatus to limit the charging current while the battery is charging, and an electro-magnet regulating responsive to voltage changes of the battery, arranged to be brought into operation for controlling said apparatus to limit the voltage of the generator, said first mentioned electromagnet having no effect on the apparatus when the second mentioned electro-magnet is operating.

17. In an electrical system of distribution, a main generator driven at a variable speed, a storage battery and work circuit supplied thereby, rheostatic apparatus for regulating the voltage of the generator, two levers independently mechanically acting upon said apparatus to control the same, a coil regulating the action of one of said levers responsive to current changes of the battery, and a coil regulating the action of the other lever responsive to voltage changes of the battery to limit the rise in generator voltage.

18. In an electrical system of distribution, a main generator, a storage battery arranged to be charged thereby, and carbon pile rheostatic apparatus for regulating the field of the generator, said apparatus including two levers for independently mechanically controlling the apparatus, a coil for controlling the action of one lever responsive to current variations to maintain a substantially constant charging current until the battery has become substantially charged, and a coil for controlling the action of the other lever responsive to voltage variations of the battery to limit the rise in voltage of the generator when the battery has become substantially charged.

19. In an electrical system of distribution, a main generator driven at a variable speed, a storage battery and work circuit supplied thereby, rheostatic apparatus for regulating the voltage of the generator, two levers independently mechanically acting upon said apparatus to control the same, a coil regulating the action of one of said levers responsive to current changes, and a coil regulating the action of the other lever responsive to voltage changes of the battery to limit the rise in generator voltage, said first mentioned coil having no effect on the apparatus when the second mentioned coil is operating and said second mentioned coil having no effect on said apparatus when said first mentioned coil is operating.

20. An electrical system of distribution having in combination a generator, driven at variable speed, a storage battery and work circuit connected to be supplied thereby, a carbon pile regulating the field strength of the generator, a coil responsive to generator voltage changes, a current responsive coil connected between the generator and battery, two movable cores for said coils respectively, means whereby movement of either core by its coil affects the resistance of said carbon pile to vary the generator field strength, said voltage coil being adapted to regulate the field strength of the generator independently of said current coil when the generator voltage reaches a predetermined value.

21. An electrical system of distribution having in combination a variable speed generator, a storage battery and work circuit connected to be supplied thereby, and means for regulating the generator to control the battery charging current including a voltage responsive coil and a current responsive coil, separately movable cores for said coils respectively, carbon pile variable resistance means varying the field strength of the generator and means connected with said cores and operating upon said variable resistance means, whereby movement of either of said cores by its coil affects the field strength of said generator, said voltage coil being adapted to regulate the field strength of the generator independently of said current coil when the voltage across the generator and battery reaches a predetermined value.

22. An electrical system of distribution having in combination a variable speed generator, a storage battery and work circuit connected to be supplied thereby, and means for regulating the generator to control the battery charging current including a voltage responsive coil and a current responsive coil, two movable cores for said coils respectively, and means whereby movement of either of said cores by its coil affects the field strength of said generator, said voltage coil being adapted to regulate the field strength of the generator independently of said current coil when the voltage across the generator and battery reaches a predetermined value.

23. In a system of the class described, a variable speed generator, a storage battery and work circuit fed thereby, and means regulating the voltage of the generator including two solenoids having cores, the movement of which affects the generator voltage, one solenoid being affected by voltage variations to limit the voltage of the generator and the other solenoid having a current responsive winding connected between the generator and battery, the first solenoid acting to regulate the generator voltage mechanically independently of the second solenoid when the voltage of the generator has reached a predetermined value and cause the second solenoid to be ineffective on the generator regulation.

24. In an electrical system of distribution, the combination of a generator, a storage battery and work circuit fed thereby, a variable resistance regulating the voltage of the generator, two magnets, an armature for each magnet and means whereby said armatures affect said variable resistance to regulate the same, one magnet being affected by voltage variations to limit the voltage of the generator and the other magnet having a current responsive winding connected between the generator and battery, the first-mentioned magnet acting to regulate the variable resistance mechanically independently of the second magnet when the voltage of the battery reaches a predetermined value.

25. In a system of the class described, a variable speed generator, a storage battery and work circuit fed thereby, a variable resistance regulating the field strength of the generator, two magnets having independently movable armatures, and means whereby said armatures affect said variable resistance to vary the field strength of the generator, one magnet being affected by voltage variations to limit the voltage of the generator, and the other magnet having a current responsive winding connected between the generator and battery, the first mentioned magnet acting to control the variable resistance independently of the second magnet when the voltage of the generator has reached a predetermined value.

26. In an electrical system of distribution, a generator, a storage battery and work circuit in operative relation thereto, a carbon pile for regulating the generator field strength, and two solenoids having independently movable cores for controlling the resistance of said pile, one solenoid being responsive to battery voltage variations, and the other being a current responsive solenoid connected between the generator and battery, to regulate the current supply by the generator, the voltage solenoid acting to control the carbon pile mechanically independently of the current solenoid when the voltage of the generator has reached a predetermined value.

27. In an electrical system of distribution, the combination of a generator, a storage battery and work circuit operatively connected thereto, the rheostat for regulating the voltage of the generator, and two magnets and their armatures, one armature being movable independently of the other, and operation of either affecting said rheostat, one magnet being affected by battery voltage variations and the other magnet having a current responsive winding connected between the generator and battery, the first mentioned magnet acting to control the rheostat independently of the second magnet, when the voltage of the generator has reached a predetermined value.

28. In an electrical system of distribution, the combination of a generator, a storage battery and work circuit in operative relation thereto, and means regulating the voltage of the generator including two magnets, an armature for each magnet and means whereby the operation of said armature by said magnets affects the regulation of the generator voltage, one magnet being affected by voltage variations to limit the voltage of the generator and the other magnet having a current responsive winding connected between the generator and battery, the first magnet acting to regulate the generator voltage mechanically independently of the second magnet when the voltage of the generator has reached a predetermined value.

29. In an electrical system of distribution, the combination of a generator, a storage battery and work circuit in operative relation thereto, and means regulating the voltage of the generator including two magnets, an armature for each magnet and means whereby the operation of said armatures by said magnets affects the regulation of the generator voltage, one magnet being affected by voltage variations to limit the voltage of the generator and the other magnet having a current responsive winding connected between the generator and battery, the first magnet acting to regulate the generator voltage when the voltage of the generator has reached a predetermined value to such an extent as to cause a diminution in current in the first magnet to render it ineffective on the generator regulation.

30. In a system of the class described, the combination of a variable speed generator, a storage battery and work circuit fed thereby, and means regulating the voltage of the generator including a carbon pile varying the generator field strength, two levers for controlling said pile, two solenoids having cores, the core of one solenoid actuating one lever and the core of the other solenoid actuating the other lever, one solenoid having a voltage winding whereby it acts to limit the voltage of the generator and the other solenoid having a current responsive winding connected between the generator and battery whereby it acts as a current limiting winding, said voltage solenoid acting to control the pile mechanically independently of the current solenoid when the voltage of the generator has reached a predetermined value.

31. In an electrical system of distribution, the combination of a generator, a storage battery and work circuit connected to be supplied thereby, a carbon pile regulating the generator field strength, a current responsive coil connected between the generator and battery adapted to control said pile to limit the current passing through said coil, and a coil responsive to generator voltage changes adapted to control said pile to limit the generator voltage independently of said current coil when the generator voltage reaches a predetermined value.

32. In an electrical system of distribution, the combination of a generator, a storage battery and work circuit connected to be supplied thereby, and means regulating the generator field strength comprising a current responsive coil connected between the generator and battery adapted to control said regulating means to limit the current passing through said coil, and a coil responsive to generator voltage changes adapted to control said regulating means to limit the generator voltage independently of said current coil when the generator voltage reaches a predetermined value.

33. In an electrical system of distribution, the combination of a generator, a storage battery and work circuit connected to be supplied thereby, and means regulating the generator field strength comprising a current responsive coil connected between the generator and battery adapted to control said regulating means to limit the current passing through said coil, and a coil responsive to generator voltage changes adapted to control said regulating means to limit the generator voltage independently of said current coil when the battery becomes substantially charged to prevent overcharging the battery.

34. An electric system comprehending a generator, and a storage battery charged thereby combined with means for governing the generator by a current responsive coil connected between the generator and the battery and independently by voltage variations.

35. An electric system comprehending a generator and a storage battery combined with a regulator for the generator, the operation of which is independently governed by useful current supplied by the generator and by the voltage of the same.

36. An electric system comprehending a generator and current utilizing means in operative relation thereto, a regulator for the generator, means whereby the voltage alone impressed upon a portion of the system by the generator may operate said regulator and means whereby current delivered to the current utilizing means may also control said regulator.

37. An electric system comprehending a generator and a regulator therefor comprising a variable resistance and means whereby fluctuations in the voltage and current supplied by the generator each independently operate said variable resistance.

38. The combination with a generator and a storage battery charged thereby of a regulator for the generator, responsive to voltage fluctuations upon the battery and independent of fluctuations in current supplied by said generator and means for regulating said generator responsive to fluctuations in current supplied by the generator and independent of the voltage across the battery.

39. The combination with a storage battery, a generator driven at variable speed supplying the same, and having its voltage normally tending to vary with its speed and with the voltage of the storage battery, of means for regulating the generator comprehending a plurality of carbon disks affecting the generator in response to variations in pressure thereupon, means for varying the effective pressure upon said disks responsive to voltage fluctuations when the battery voltage is above a certain limit and means for varying the effective pressure upon said disks responsive to current fluctuations when the battery voltage is below this limit, each of said varying means being capable of independent operation.

40. The combination with a generator, of means for regulating the same comprehending a plurality of contacting members affecting the generator in response to pressure variations upon said members, means for affecting the effective pressure upon one end of said members in response to voltage fluctuations and means for effecting the pressure upon the other end of said members in response to current fluctuations, each of said pressure affecting means being capable of independent operation to affect the generator.

41. The combination with a generator and a circuit utilizing current therefrom, of means for regulating the generator comprehending means for affecting the operation of the generator in response to pressure variations upon said means, means for varying the effective pressures at one part of said regulating means in response to voltage fluctuations across said circuit and means for varying the effective pressure at another part of said regulating means in response to voltage fluctuations in said circuit.

42. The combination with a storage battery, a generator driven at variable speeds supplying the same and having its voltage normally tending to vary with its speed and with the voltage of the storage battery, of means for regulating the generator comprehending means affecting the operation of the generator in response to pressure variations upon said means, voltage responsive means for varying the effective pressure upon said pressure affected means to hold the generator voltage constant throughout speed changes when the battery voltage is above a certain limit and current responsive means for varying the effective pressure upon said pressure affected means to hold the useful current in a circuit supplied by the generator constant, said voltage responsive means being capable of operation independently of said current responsive means in the regulation of the generator.

43. The combination of a generator driven at variable speed, a plurality of storage batteries and work circuits connected to be supplied by the generator, a carbon pile regulating the generator field strength, a magnet responsive to generator voltage variations, a magnet serially connected between the generator and said batteries and work circuit, to be responsive to variations in current from the generator, means whereby said voltage magnet acts on said carbon pile independently of said current magnet, and means whereby said current magnet may affect the pile to limit the generator current.

44. The combination of a generator driven at variable speed, a plurality of storage batteries and work circuits connected to be supplied by the generator, means regulating the generator field strength, a magnet responsive to generator voltage variations, a magnet serially connected between the generator and said batteries and work circuit to be responsive to variations in current from the generator, means whereby said voltage magnet acts on said regulating means independently of said current magnet, and means whereby said current magnet may affect said regulating means to limit the generator current.

45. The combination of a generator driven at variable speed, a storage battery and work circuit connected to be supplied by the generator, means regulating the generator field strength, a magnet responsive to generator voltage variations, a magnet serially connected between the generator and said battery and work circuit to be responsive to variations in current from the generator, means whereby said voltage magnet acts on said regulating means independently of said current magnet, and means whereby said current magnet may affect said regulating means to limit the generator current.

46. A system of electrical distribution having in combination a generator driven at a variable speed, a storage battery connected to be charged thereby, a carbon pile regulating the field strength of the generator, a coil responsive to generator voltage changes, a core acted upon by said coil, and adapted to control the resistance of said pile to limit the voltage of the generator, a current responsive coil connected between the generator and battery, a movable core adapted to be lifted by said current coil, means whereby movement of said second core may affect said pile to limit the current through said current coil, and means acting as a stop for limiting the downward movement of the core of the current coil.

47. A system of electrical distribution having in combination a generator driven at a variable speed, a storage battery connected to be charged thereby, a carbon pile regulating the field strength of the generator, a coil responsive to generator voltage changes, a core adapted to be lifted by said coil, a lever connected to said core and adapted to control the resistance of said pile to limit the voltage of the generator, a current responsive coil connected between the generator and battery, a movable core adapted to be lifted by said current coil, means whereby movement of said second core may affect said pile to limit the current through said current coil, and means acting as a stop for limiting the downward movement of the core of the current coil, said voltage coil acting to control the resistance of said pile independently of said current coil when the generator voltage reaches a predetermined value.

48. In a car lighting apparatus, in combination, an electric generator, a storage battery connected to be charged thereby, a variable resistance medium, comprising a plurality of contacting members adapted to vary their aggregate resistance with pressure thereon, said resistance medium being connected in the field circuit of said generator, a current responsive coil connected between said generator and said battery, a voltage coil connected across the charging circuit, separately movable cores respectively coacting with said coils, and means mechanically connected with said cores and tending normally to compress said medium and upon either of said cores being attracted, tending, to weaken the pressure upon said medium, said voltage coil being adapted to act to weaken said medium independently of said current coil.

49. An electrical system of distribution having in combination a generator driven at variable speed, a storage battery connected to be charged thereby, and means regulating the generator comprising a current responsive coil connected between the generator and battery acting to limit the current flowing through said coil, and a coil responsive to generator voltage changes acting to regulate the generator independently of said current coil to limit the generator voltage when the battery has become substantially charged.

50. In a car lighting apparatus, in combination, a generator driven at variable speed, a storage battery and work circuit connected to be supplied thereby, and means regulating the generator comprising a carbon pile regulating the field strength thereof, two solenoids, one having a current responsive coil connected between the generator and battery and the other having a coil connected to be responsive to voltage variations of the generator, cores respectively within said solenoids, and means whereby the weight alone of one of said cores and parts connected thereto acts to compress said pile substantially to its maximum.

51. In a car lighting apparatus, in combination, a generator driven at variable speed, a storage battery and work circuit connected to be supplied thereby, and means regulating the generator comprising a carbon pile regulating the field strength thereof, a solenoid having a current responsive coil connected between the generator and battery, a core operating within said solenoid and means whereby the weight alone of said core and parts connected thereto and moving therewith acts to compress said pile substantially to its maximum.

52. In a car lighting apparatus, in combination, a generator driven at variable speed, a storage battery and work circuit connected to be supplied thereby, and means regulating the generator comprising a carbon pile regulating the field strength thereof, a solenoid having a coil responsive to voltage changes of the generator, a core operating within said solenoid and means whereby the weight alone of said core and parts connected thereto and moving therewith acts to compress said pile substantially to its maximum.

53. An electric system comprehending a generator and storage battery connected thereto combined with a regulating apparatus for the generator, the operation of which is governed by current variations and independently by voltage variations when the voltage across the battery has reached a predetermined value.

54. The combination with a generator and storage battery charged thereby of apparatus for regulating the generator responsive to current variations to limit the battery charging current and independently responsive to voltage variations to decrease the battery charging current when the battery reaches a predetermined state of charge.

55. The combination of a variable speed generator, a battery connected thereto, a current coil and a voltage coil, means for causing said current coil to affect the voltage of said generator while the battery is below a given state of charge, and for causing said voltage coil to regulate the voltage of said generator without effect from the current coil when the battery is above a given state of charge.

56. The combination of a variable speed generator, a battery connected thereto, a current coil affecting the regulation of the generator during speed changes while the battery is below a certain state of charge, and a voltage coil independently thereof effecting said regulation when the battery is above a given state of charge, said current coil being then without effect upon the generator regulation.

57. The combination of a variable speed generator, a battery connected thereto, a current coil and a voltage coil, and means whereby a regulation of the generator during speed changes is effected by the current coil during certain conditions of the battery and by the voltage coil alone during other conditions of the battery.

58. The combination of a variable speed generator, a battery connected thereto, a current coil acting to regulate said generator, a voltage coil, and means whereby said voltage coil may assume the regulation of the generator and supersede the regulating action of the current coil when the battery is above a given state of charge.

In testimony whereof, I have signed my name to this specification, in the presence of two subscribing witnesses.

JOHN W. JEPSON.

Witnesses:
  JOHN A. ANDERSON,
  WALLACE E. BARNES.